Patented June 16, 1942

2,286,298

UNITED STATES PATENT OFFICE 2,286,298

ALUMINUM SOLDERING FLUX

Mike A. Miller, New Kensington, Pa., assignor to Aluminum Company of America, Pittsburgh, Pa., a corporation of Pennsylvania No Drawing. Application September 8, 1941, Serial No. 410,041

10 Claims. (Cl. 148—23)

This invention relates to an improved soldering flux especially adapted for use in soft soldering aluminum members. By the term "aluminum," I mean to include both the commercially pure metal and alloys containing at least 50 per cent by weight aluminum.

In United States Patents Nos. 2,238,068 and 2,239,069, issued to me, I have described fluxes for the soft soldering of aluminum which contain one or more boron-fluorine-containing addition compounds of the poly-amines and/or amino-alcohols as their essential ingredient. Such boron-fluorine-containing substances as boron trifluoride, hydrofluoboric acid, and the heavy metal fluoborates are used to form the addition compounds with these amines. Some of the amino-alcohols which have been found to be very satisfactory for this purpose are monoethanolamine, diethanolamine, triethanolamine, diethylaminoethanol, monoisopropanolamine, triisopropanolamine, hydroxy-ethyl ethylene diamine, and phenyl diethanolamine, while some representative poly-amines are ethylene diamine, diethylene triamine, triethylene tetramine, and tetraethylene pentamine. These fluxes are particularly effective in removing the oxide film which is always present on aluminum surfaces, yet in so doing, they do not appear to attack the metal itself to any great extent.

While the fluxes described above are entirely satisfactory for many commercial uses, there are some applications where an even more active flux would be desirable. When speaking of the activity of a flux, I refer to the ability of the flux to remove the oxide coating found on aluminum members; the greater the activity, the greater will be the area over which the oxide film is removed by a given amount of flux. This activity of the flux is in turn reflected in the extent of the area covered by the molten solder. In many soldering operations, for example, it is essential that the solder cover a relatively large area often difficult of access, or that the solder take the form of a comparatively thin and even layer. Such soldering operations frequently demand that the flux be applied, often in limited quantities, to a single surface portion, and that it thereafter spread over and remove the oxide coating from a relatively large area. In these and other soldering operations it is desirable to employ a flux of the greatest activity obtainable.

It is therefore an object of this invention to provide an improved flux for the soft soldering of aluminum members. More particularly, it is an object of this invention to provide a method of increasing the activity of certain fluxes containing boron-fluorine addition compounds of amino-alcohols and poly-amines.

I have discovered that I can increase the activity of certain of the fluxes described in the patents to which reference has been made hereinabove, by a treatment of them prior to their application to the metal surface, consisting of incorporating therewith relatively small quantities of ammonia either in free or certain combined forms, and thereafter heating the flux mixture for several minutes at a relatively low temperature. The ammonia which accomplishes this purpose is here designated as actifying ammonia and is distinguished from inert or surplus ammonia. For the purposes of my invention, the poly-amines and amino-alcohols are considered to be equivalents because of their chemical similarity, their behavior in soldering fluxes, and their response to the ammonia treatment described herein. The particular fluxes which are benefited by the treatment with ammonia are those that contain in addition to one or more of the aforesaid amino compounds, at least two boron-fluorine compounds, one of which is a heavy metal fluoborate, and the other an acidic boron-fluorine compound free from any metallic constituent. Furthermore, the amine must be an aliphatic compound. Fluxes treated in this manner may be called ammoniated amine fluxes.

The ammonia may be added to a previously prepared ammonia-free flux or it may be introduced during the preparation of the flux. It is not fully understood why the addition of ammonia and the subsequent heating thereof should increase the activity of the flux, but it is probable that some complex ammonium salt is formed which is particularly effective in aiding the removal of the oxide film from aluminum surfaces. Such a complex salt may also modify the surface tension relationships in such a manner as to facilitate the spread of the molten solder. Fluxes whose activity has been increased in this manner are able to clean a larger area of aluminum than untreated fluxes, and they are thus enabled to effect a more extensive spread of the solder. The ammonia treatment and subsequent heating described herein will often enable a flux to cause a given amount of solder to spread nearly twice as far as it does when the same flux without any ammonia addition is employed.

The amino fluxes to which this invention relates contain two types of boron-fluorine-containing compounds, namely, those that contain a heavy metal and those that do not contain any metallic component and are of an acidic character. Compounds of this latter type are herein referred to as "acidic" boron-fluorine-containing compounds and include those boron-fluorine-containing compounds recognized as acids such as di-hydroxy fluoboric acid and hydrofluoboric acid, together with such gaseous boron-fluorine-containing compounds as boron trifluoride which give an acid reaction when present in aqueous solution and the ammonium salts of these boron-fluorine-containing compounds. These ammonium salts likewise exhibit acidic properties when in aqueous solution. The acidic boron-fluorine-containing compounds may be used in the proportion of one or more molecules, but preferably only a fraction of a molecule, to one molecule of an amine. The heavy metal boron-fluorine-containing compounds, such as the fluoborates of zinc, tin, cadmium, lead, and the like, are to be used in amounts of 0.5 to 25 per cent of the total weight of the flux. If two or more heavy metal fluoborates are used, the total amount should not exceed about 25 per cent. Furthermore, two or more of the amino compounds may be employed in making the flux, that is, two or more poly-amines, or amino-alcohols, or a mixture of them, can be used in the flux.

I have discovered that the activity of the amino fluxes containing at least two boron-fluorine compounds, namely, a heavy metal fluoborate and an acidic boron-fluorine-containing substance free from any metallic constituent, as described above, is increased by adding between 0.5 and 3 per cent of free or combined ammonia to said fluxes and then heating them before employing them in a soldering operation. This is the range within which the ammonia is effective, that is, if larger amounts are employed, there is no appreciable increase in activity of the flux, the indications being that only 3 per cent or less of the ammonia affects the activity of the flux. On the other hand, more than 0.5 per cent of added ammonia is required to obtain a commercially useful improvement in acivity of the flux. The amount of ammonia introduced in the flux which affects the activity of the flux may be referred to as the actifying ammonia as distinguished from any inert or surplus free or combined ammonia that may be present but does not influence the flux activity. The ammonia content should be calculated on the basis of the formula, $NH_3$. The optimum amount of ammonia which will yield the best results varies somewhat with the particular amines being treated, but of course it lies within the foregoing range. In general, I prefer to add from about 1 to 2 per cent of this ammonia constituent.

The ammonia may be added to the prepared flux, or supplied with the other components making up the flux, either in the form of dry ammonia gas or in the form of a decomposable ammonium salt, although I prefer to add it in the form of a suitable salt. This addition of ammonia in either gaseous or salt form is preferably carried out at room temperature. Where the ammonia is supplied in the form of a gas, the material to which it is added should preferably be in liquid form, and the ammonia content of the material may be determined by weight increase. When an ammonium salt is employed, the amount of ammonia added is calculated by determining the $NH_3$ content of the salt.

Any salt of ammonia may be employed to furnish the ammonia, provided the salt is decomposable by the amine and provided further that the substances and the amount of said substances combined with the ammonia to form the salt do not interfere with the action of the flux. I prefer to add the ammonia in combination with boron and fluorine such as in the salt, ammonium fluoborate, $NH_4BF_4$, or a heavy metal salt such as cadmium fluoborate hexammine, $Cd(BF_4)_2.6NH_3$. One may also employ mixtures of ammonium fluoride, $NH_4F$, or acid ammonium fluoride, $NH_4HF_2$, with boric acid, $H_3BO_3$, boric oxide, $B_2O_3$, or an organic borate. Mixtures of boron trifluoride ammonia, $BF_3.NH_3$, and ammonium fluoride or acid ammonium fluoride can also be used. For example, a desirable flux whcih contains about 1.4 per cent by weight of ammonia before being heated may be formed by combining 8.6 per cent ammonium fluoborate with 86.4 per cent triethanolamine, $N(CH_2CH_2OH)_3$, and 5 per cent cadmium fluoborate hexahydrate, $$Cd(BF_4)_2.6H_2O$$

An equally desirable flux which contains about 1.3 per cent by weight of ammonia before being heated may be obtained by combining 5 per cent by weight of cadmium fluoborate hexammine with 86 per cent triethanolamine and an equivalent of 9 per cent hydrofluoboric acid, $HBF_4$, added in the form of anhydrous boron trifluoride, $BF_3$, and hydrogen fluoride, $HF$, gases.

Following the addition of ammonia gas or ammonium salt, it is necessary to heat the flux to a temperature above about 50° C. but below the temperature at which the amine decomposes for a period of at least several minutes. The temperature to which the ammoniated flux is heated will be higher in the case of some fluxes than it is with others, and likewise the period of heating will vary depending on the nature and amount of flux. This heating causes some loss of ammonia, though not all of the ammonia escapes; however, it is difficult to say how much must remain in order to have an increased flux activity. The fact that the activity of ammoniated fluxes is greater than those without ammonia may be accepted as evidence that some ammonia remains in the flux after heating or that the ammonia has caused some change in the flux. In the case of some fluxes, a heating period of as short as 3 to 5 minutes at temperatures as low as 60 to 70° C. will appreciably increase the activity of the flux. In general, I prefer to heat the ammoniated fluxes to temperatures no higher than 150° C., though it is possible to use higher temperatures. The time required for heating will vary according to the amine and the quantity being treated but generally the heating period need not exceed about 30 minutes per pound of flux. The maximum temperature to which the flux is heated should in no case exceed that at which the amine or amines in the flux decompose. It is not known what purpose this heating serves, but it is believed that it completes some reaction between the ammonia and the other components of the flux. Although there is some ammonia loss during this heating, an initial ammonia content of about 0.5 to 3 per cent by weight evidently provides enough ammonia to improve the activity of the flux. If this heating step is omitted, the addition of ammonia to the flux will occasion little, if any, increase in the activity of the flux; in any event there is not a sufficient increase in activity to justify commercial use.

In making the ammoniated fluxes, other substances than the amino and boron-fluorine-containing compounds may be employed to modify the physical condition of the flux. Various plasticizers known in the flux art can be used for this purpose.

The data in the following table are illustrative of my invention. The test results included therein show that the addition of ammonia to a flux and the subsequent heating thereof will enable the flux to cause a greater spread of solder than is the case with the same flux without any ammonia addition. For each test a 0.35 gram sample of an appropriate soft solder was placed on a small square of commercial aluminum sheet about 6 inches on a side, together with about 0.5 gram of the particular flux indicated. The aluminum sheet was then heated on a hot plate until the flux and the solder became molten, and the heating was continued until the molten solder had reached the limit of its spread under the influence of the particular flux employed therewith. The total heating period generally amounted to about one minute. The solder spread out over an area that was roughly circular in shape. The sample was then cooled and the average diameter of the circle of spread of the solder was measured. The magnitude of this spread is considered to be indicative of the activity of the flux. The flux samples included in the following table were prepared by combining the indicated amine compound with either hydrofluoboric acid (added in the form of anhydrous boron trifluoride and hydrogen fluoride gases), or ammonium fluoborate, in the ratio of 1 mol. of amine to 0.2 mol. of either hydrofluoboric acid or ammonium fluoborate, though the amount of each of these components is given in the table in terms of per cent by weight of the entire flux. The heavy metal fluoborate component of the flux was supplied as cadmium fluoborate hexahydrate, 5 per cent by weight of this salt being present in each flux tested. The ammonia content of the fluxes numbered 3, 8, and 10 in the following table was supplied by the added ammonium fluoborate, whereas in the case of the other fluxes included in the table, the ammonia was supplied by passing ammonia gas through the liquid amine, in which the hydrofluoboric acid component had already been incorporated, until the desired increase in weight was reached. The fluxes were then heated to 85° C. for about 15 minutes prior to the tests. The composition of the flux in the following table is expressed in terms of per cent by weight of the entire flux.

subsequent heating of an ammonia treated flux is essential to increasing the activity of the flux as compared to the heated flux which caused the solder to cover an area 23 mm. in diameter.

Having thus described my invention and certain embodiments thereof,

I claim:

1. The method of increasing the activity of a soldering flux containing at least two boron-fluorine-containing compounds, one of which is a heavy metal fluoborate and the other an acidic boron-fluorine-containing compound, and at least one amine selected from the group of amines consisting of aliphatic poly-amines and aliphatic amino-alcohols, which comprises introducing a relatively small amount of actifying ammonia in said flux and thereafter heating the flux above about 50° C. but below the temperature of decomposition of any portion of the amine component.

2. The method of increasing the activity of a soldering flux containing at least one amine of the group consisting of the aliphatic poly-amines and amino-alcohols, and at least two boron-fluorine-containing compounds, one of which is a heavy metal fluoborate and the other an acidic boron-fluorine-containing compound, said method comprising introducing from about 0.5 to 3 per cent by weight of actifying ammonia in said flux and thereafter heating the flux mixture at a temperature above 50° C. but below the temperature of decomposition of any of the amine component for a period not exceeding 30 minutes per pound of flux.

3. The method of increasing the activity of a soldering flux containing at least one amine of the group consisting of the aliphatic poly-amines and amino-alcohols, and at least two boron-fluorine-containing compounds, one of which is a heavy metal fluoborate and in an amount of 0.5 to 25 per cent of the weight of the entire flux, and the other being an acidic boron-fluorine-containing compound, said method comprising introducing from about 1 to 2 per cent by weight of actifying ammonia in said flux mixture and thereafter heating the flux at a temperature between about 50 and 150° C. for a period not exceeding 30 minutes per pound of flux.

4. The method of increasing the activity of a soldering flux containing an amino-alcohol and at least two boron-fluorine-containing compounds, one of which is a heavy metal fluoborate in an amount of 0.5 to 25 per cent of the entire

*Initial composition of flux—weight per cent*

| Flux constituents | Flux Nos. | | | | | | | | | |
|---|---|---|---|---|---|---|---|---|---|---|
| | 1 | 2 | 3 | 4 | 5 | 6 | 7 | 8 | 9 | 10 |
| Amine: | | | | | | | | | | |
| Triethanolamine | 85.0 | 83.9 | 83.3 | 83.2 | | | | | | |
| Hydroxyethyl ethylene diamine | | | | | 81.3 | 80.2 | 79.6 | 79.1 | | |
| Tetraethylene pentamine | | | | | | | | | 86.9 | 85.5 |
| Boron-fluorine compounds: | | | | | | | | | | |
| $HBF_4(HF+BF_3)$ | 10.0 | 9.9 | *9.8 | 9.8 | 13.7 | 13.55 | 13.4 | *13.3 | 8.1 | *7.95 |
| $Cd(BF_4)_2 \cdot 6H_2O$ | 5 | 5 | 5 | 5 | 5 | 5 | 5 | 5 | 5 | 5 |
| Ammonia | 0 | 1.2 | *1.9 | 2.0 | 0 | 1.25 | 2.0 | *2.6 | 0 | *1.55 |
| Diam. in mm. of area covered by 0.35 g. solder | 14 | 20 | 23 | 23 | 24 | 38 | 50 | 50 | 12 | 16 |

*Material derived from $NH_4BF_4$.

A sample of the No. 4 flux composition that was not heated prior to the solder spreading test was also subjected to that test and it was observed that the solder only covered an area 15 mm. in diameter, thus demonstrating that the weight of the flux, and the other being an acidic boron-fluorine-containing compound, said method comprising introducing from about 1 to 2 per cent by weight of actifying ammonia in said flux and thereafter heating the flux at a temperature between about 50 and 150° C. for a period not exceeding 30 minutes per pound of flux.

5. The method of increasing the activity of a soldering flux containing a poly-amine and at least two boron-fluorine-containing compounds, one of which is a heavy metal fluoborate in an amount of 0.5 to 25 per cent of the entire weight of the flux, the other substance being an acidic boron-fluorine-containing compound, said method comprising introducing from about 1 to 2 per cent by weight of actifying ammonia in said flux and thereafter heating the flux at a temperature between about 50 and 150° C. for a period not exceeding 30 minutes per pound of flux.

6. The method of increasing the activity of a soldering flux containing at least one amine of the group consisting of the aliphatic poly-amines and amino-alcohols, and at least two boron-fluorine-containing compounds, one of which is a fluoborate of one of the metals of the group composed of cadmium, zinc, tin and lead, said fluoborate being present in an amount of at least 0.5 per cent but not over 25 per cent by weight, the other being an acidic boron-fluorine-containing compound, said method comprising introducing from about 0.5 to 3 per cent of actifying ammonia by weight in said flux at room temperature and thereafter heating said flux at a temperature between 50 and 150° C. for a period not exceeding 30 minutes per pound of flux.

7. The method of increasing the activity of a soldering flux containing at least one amine of the group consisting of the aliphatic poly-amines and amino-alcohols, and at least two inorganic boron-fluorine-containing compounds, one of which is a heavy metal fluoborate in an amount of at least 0.5 per cent but not more than a total of 25 per cent of the entire weight of the flux, the other being an acidic boron-fluorine-containing compound, said method comprising introducing boron-fluorine-containing salts of ammonia in an amount such that the ammonia content lies between about 0.5 and 3 per cent of the weight of the flux, and thereafter heating the flux mixture at a temperature between about 50 and 150° C. for a period not exceeding 30 minutes per pound of flux.

8. The method of increasing the activity of a soldering flux containing at least one amine of the group consisting of the aliphatic poly-amines and amino-alcohols, and at least two inorganic boron-fluorine-containing compounds, one of which is a heavy metal fluoborate in an amount of at least 0.5 per cent but not more than a total of 25 per cent of the entire weight of the flux, the other being an acidic boron-fluorine-containing compound, said method comprising introducing ammonium fluoborate as the second boron-fluorine-containing compound in an amount such that the ammonia content lies between about 0.5 and 3 per cent of the weight of the flux, and thereafter heating the flux mixture at a temperature between about 50 and 150° C. for a period not exceeding 30 minutes per pound of flux.

9. The method of increasing the activity of a soldering flux containing at least one amine of the group consisting of the aliphatic poly-amines and amino-alcohols, and at least two inorganic boron-fluorine-containing compounds, one of which is cadmium fluoborate and the other being an acidic boron-fluorine-containing compound, said method comprising introducing ammonia in said flux in the form of cadmium fluoborate hexammine in an amount such that the ammonia content of said compound lies between about 0.5 and 3 per cent of the weight of the flux, and thereafter heating said flux mixture at a temperature between about 50 and 150° C. for a period not exceeding 30 minutes per pound of flux.

10. The method of increasing the activity of a soldering flux containing at least one amine of the group consisting of the aliphatic poly-amines and amino-alcohols, and at least two inorganic boron-fluorine-containing compounds, one of which is a heavy metal fluoborate in an amount of at least 0.5 per cent but not more than a total of 25 per cent of the entire weight of the flux, the other being an acidic boron-fluorine-containing compound, said method comprising introducing ammonia gas in said flux in an amount such that weight of the added ammonia lies between about 0.5 and 3 per cent of the weight of the flux, and thereafter heating said flux mixture at a temperature between about 50 and 150° C. for a period not exceeding 30 minutes per pound of flux.

MIKE A. MILLER.